United States Patent [19]

Hazel et al.

[11] 4,417,330
[45] Nov. 22, 1983

[54] OPTICAL MEMORY SYSTEM PROVIDING IMPROVED FOCUSING CONTROL

[75] Inventors: Robert L. Hazel, Thousand Oaks; Edward V. LaBudde, Newbury Park, both of Calif.

[73] Assignee: Burroughs Corporation, Detroit, Mich.

[21] Appl. No.: 311,630

[22] Filed: Oct. 15, 1981

[51] Int. Cl.³ .............................................. G11B 7/00
[52] U.S. Cl. ...................................... 369/32; 250/201; 369/45; 369/100; 369/109; 369/275
[58] Field of Search ........................ 369/43, 44, 45, 32, 369/33, 100, 106, 109, 121, 275; 358/342, 345, 347; 250/201

[56] References Cited

U.S. PATENT DOCUMENTS

| 4,038,679 | 7/1977 | Bouwhuis et al. | 369/45 |
| 4,097,730 | 6/1978 | Korpel | 369/45 X |
| 4,290,122 | 9/1981 | Bates et al. | 369/43 |

Primary Examiner—Robert L. Richardson
Attorney, Agent, or Firm—Nathan Cass; Kevin R. Peterson; David G. Rasmussen

[57] ABSTRACT

A laser optical system including a reading beam for reading optical data recorded in one or more tracks of a rotating disk optical recording medium. The disk includes a plurality of preformatted headers spaced along the track wherein each header includes a plurality of spaced focusing optical holes having dimensions chosen based on the diameter of the focused laser beam spot. Traversal of these optical holes by the reading beam produces a reflected beam which varies in a manner dependent upon the quality of focusing of the beam. Peak detection circuitry responsive to this reflected beam is used to produce a high gain focusing signal which is combined with a low gain, high capture range focusing signal provided by a geometric focus detector to derive a precise, offset-free focusing control signal which is applied to a focusing motor to main precise focusing of the beam on the disk.

8 Claims, 7 Drawing Figures

DIRECTION OF DISK ROTATION ▶

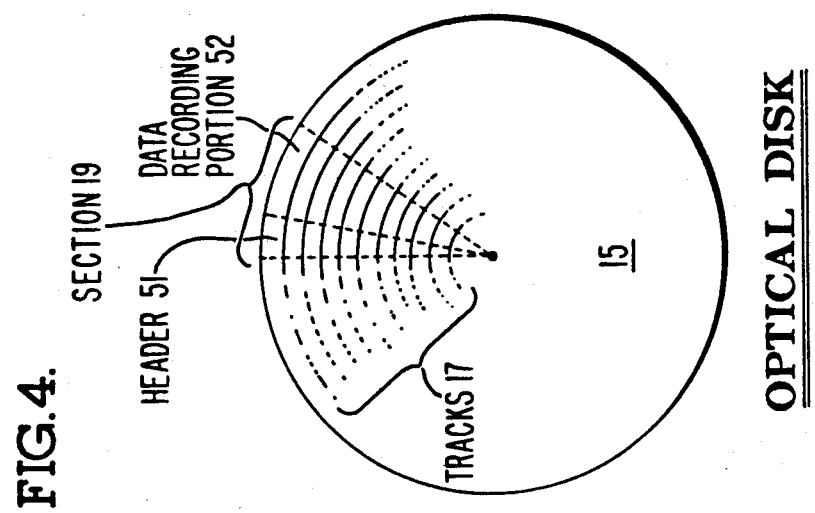
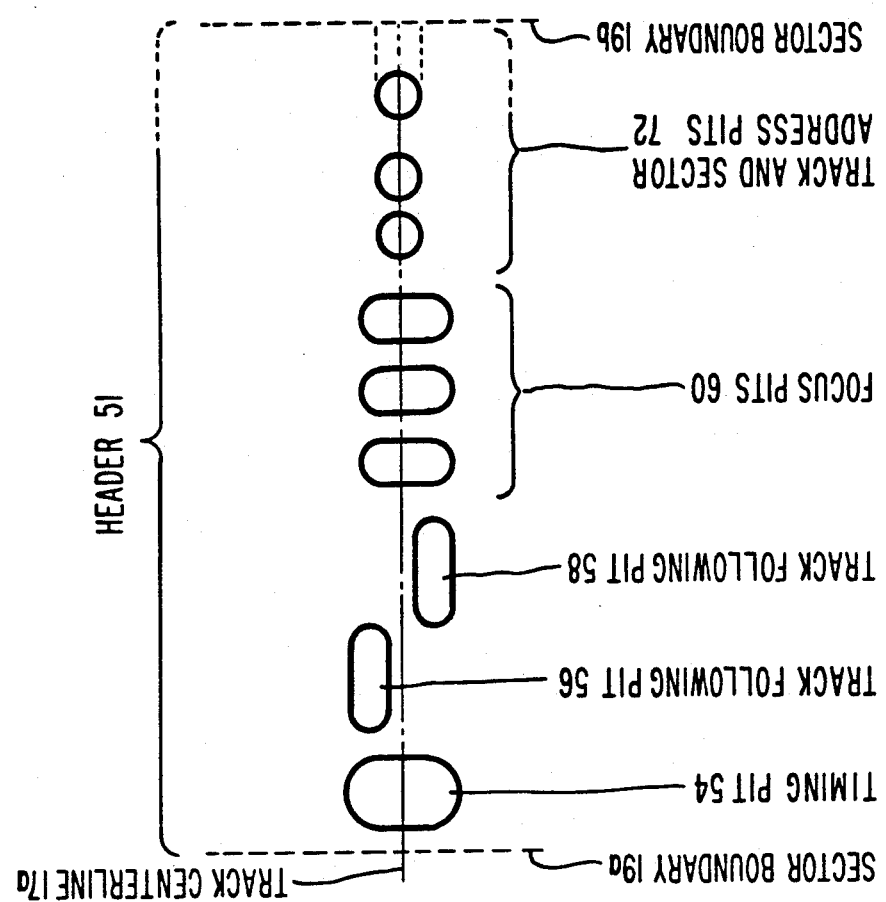

FIG.6.
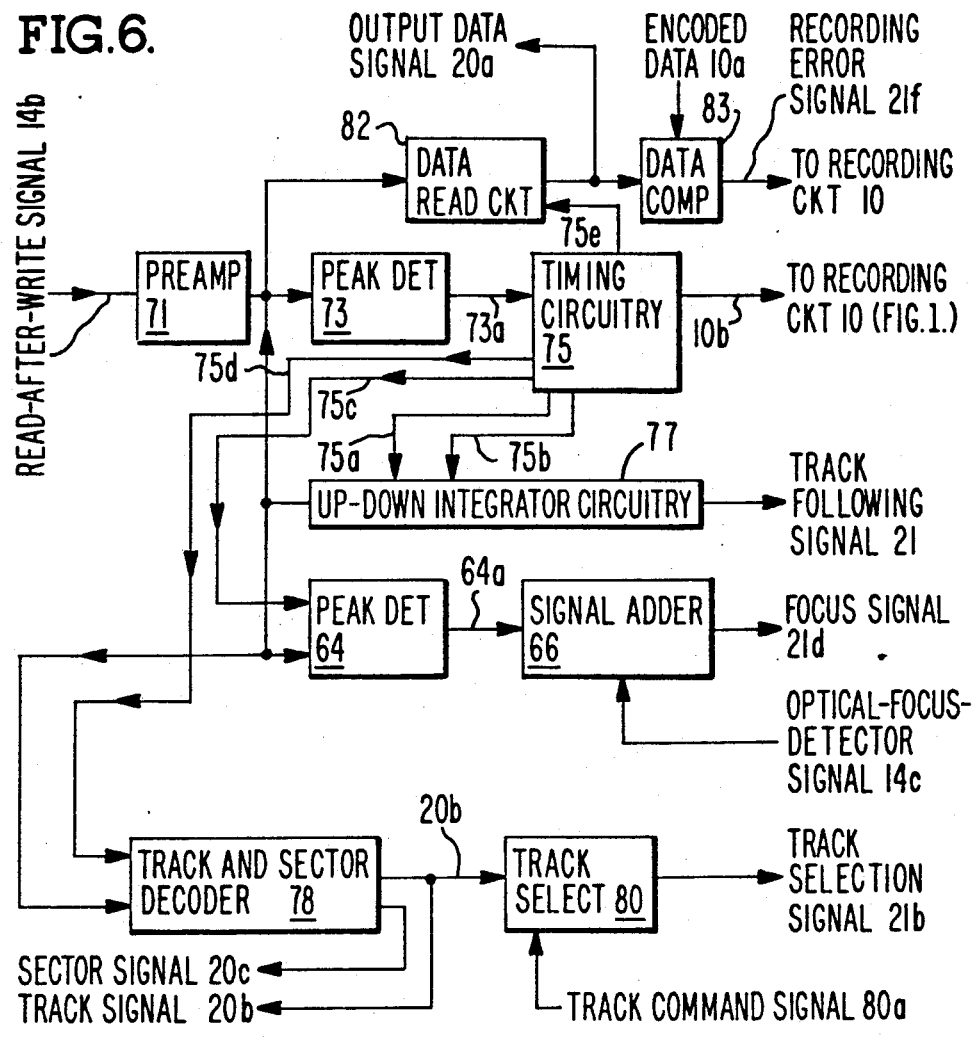
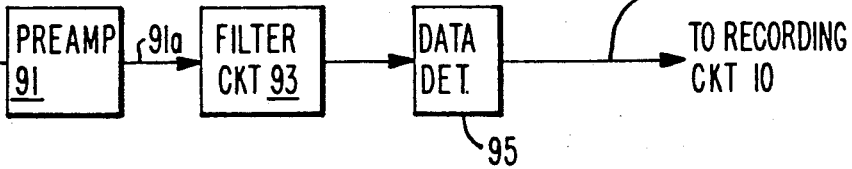

OPTICAL MEMORY SYSTEM PROVIDING IMPROVED FOCUSING CONTROL

CROSS REFERENCE TO RELATED PATENT APPLICATIONS

This patent application contains subject matter relating to our commonly assigned copending patent applications Ser. No. 311,628, Ser. No. 311,629 and Ser. No. 311,745, all filed concurrently herewith.

BACKGROUND OF THE INVENTION

The present invention relates generally to improved means and methods for optically recording and/or reading data, and more particularly to improved means and methods for providing high density optical recording and reading of data on an optical storage medium.

In recent years considerable effort has been expended to develop improved methods and apparatus for optically recording and reading on a suitable medium because of the unusually high recording density potential offered by optical recording. Examples of various known methods and approaches are revealed in the following references:

| U.S. PAT. DOCUMENTS | | |
|---|---|---|
| U.S. Pat. No. | Date Issued | Inventor(s) |
| 4,216,501 | 8/5/80 | Bell |
| 4,222,071 | 9/9/80 | Bell, et al. |
| 4,232,337 | 12/4/80 | Winslow, et al. |
| 4,243,848 | 1/6/81 | Utsumi |
| 4,243,850 | 1/6/81 | Edwards |
| 4,253,019 | 2/24/81 | Opheij |
| 4,253,734 | 3/3/81 | Komurasaki |
| 4,268,745 | 5/19/81 | Okano |

PUBLICATIONS

R. A. Bartolini, et al., "Optical Disk Systems Emerge", IEEE Spectrum, August 1978, pp. 20-28.

G. C. Kenney, et al., "An Optical Disk Replaces 25 Mag Tapes", IEEE Spectrum, February 1979, pp. 33-38.

K. Bulthuis, et al., "Ten Billion Bits on a Disk", IEEE Spectrum, August 1979, pp. 26-33.

A. E. Bell, et al., "Antireflection Structures for Optical Recording", IEEE Journal of Quantum Electronics, Vol. QE-14, No. 7, July 1978, pp. 487-495.

The subject matter of these references is to be considered as incorporated herein.

SUMMARY OF THE PRESENT INVENTION

The primary purpose of the present invention is to provide significantly improved methods and apparatus over those disclosed in the foregoing references for optically recording and/or reading data from an optical storage medium.

In a particular preferred embodiment of the present invention, the reliability and accuracy of optical recording and reading with respect to a rotating optical disk is significantly enhanced by the employment of a specially chosen preformatting for the optical disk which functions in conjunction with a three-beam laser arrangement and read signal processing electronic circuitry so as to provide significantly improved and more accurate control over recording and reading operations.

The specific nature of the invention as well as other objects, advantages, features and uses of the invention will become evident from the following description of a preferred embodiment taken in conjunction with the accompanying drawings.

BRIEF DESCRIPTION OF THE DRAWINGS

FIG. 4 is a schematic diagram generally illustrating the arrangement and formatting of data on the optical disk.

FIG. 5 is a schematic diagram illustrating details of the header formatting shown in FIG. 4.

FIG. 6 is a block electrical diagram illustrating a preferred implementation of the signal processing electronics of FIG. 1.

DETAILED DESCRIPTION OF THE INVENTION

Like numerals and characters designate like elements throughout the figures of the drawings.

Figure 1:
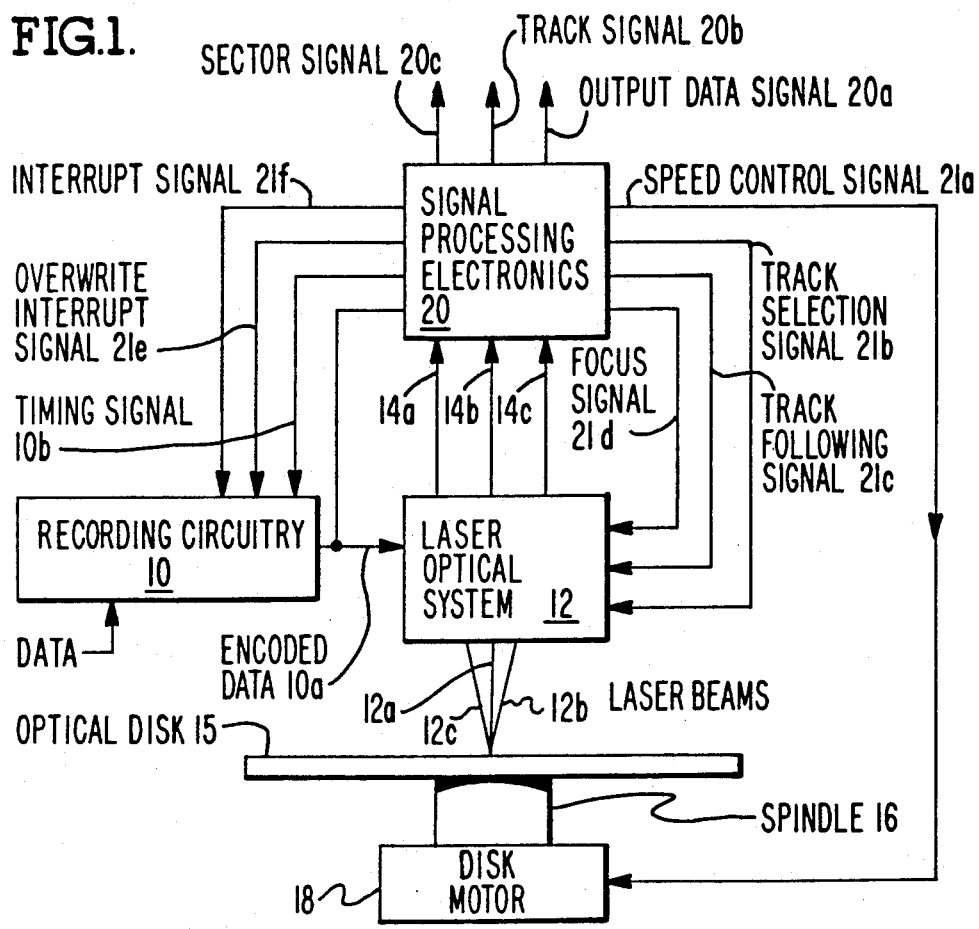
FIG. 1 is an overall block diagram of an optical recording and reproducing system incorporating a preferred embodiment of the present invention.

Reference is initially directed to FIG. 1, which generally illustrates the basic portions of a preferred embodiment of an optical recording and reading system incorporating the present invention. The data to be recorded is first applied to recording circuitry 10 which encodes the applied data using, for example, a conventional encoding format of the type employed for magnetic recording, such as non-return-to-zero, return-to-zero, etc. Conventional error checking may also be provided for the encoded signal.

The encoded data 10a from the recording circuitry 10 is applied to a laser optical system 12. The laser optical system 12 generates three laser beams 12a, 12b and 12c which are focused at spaced locations along the center line of the same selected track of a preformatted optical disk 15 supported on a precision spindle 16 for rotation by a motor 18. The optical disk 15 may, for example, be a trilayer disk of the type disclosed in the aforementioned U.S. Pat. No. 4,222,071 and in the aforementioned article by Bell, et al.

Laser beam 12a is a writing beam which is modulated by the encoded data so as to form optically detectable changes in a selected track of the optical disk 15 representative of the encoded data. It is to be understood that the optically detectable changes produced in the disk by the write laser beam 12a need not be physical changes, such as pits or physical holes. The only requirement is that optically detectable changes be produced in selected areas of the disk in response to the writer laser beam 12a which are representative of the encoded data 10a. For the purpose of this description, all of the possible types of optically detectable changes that can be produced will hereinafter be referred to as optical holes.

Figure 2:
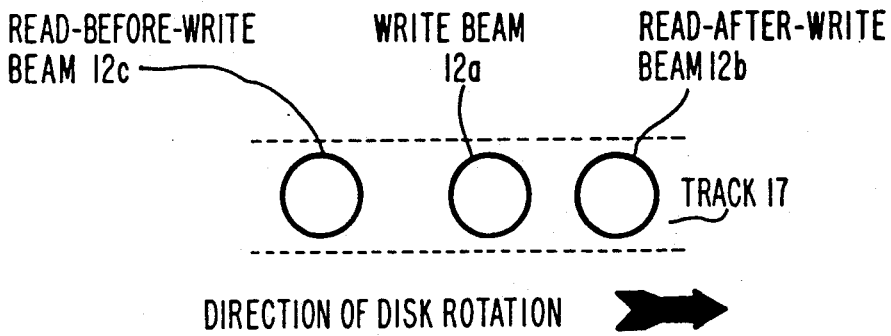
FIG. 2 illustrates the relative locations of the three laser beams provided by the system of FIG. 1 when focused on a selected track of the optical disk.

Laser beams 12b and 12c shown in FIG. 1 are reading beams. As typically illustrated in FIG. 2, the reading beam 12b is a read-after-write beam which is accordingly focused behind the writing beam 12a on the center line 17a of a selected track 17, while the reading beam 12b is a read-before-write beam and is accordingly focused ahead of the writing beam 12a. The intensity of the read beams 12b and 12c are chosen so that they will not disturb the integrity of previously recorded information. The read beams are reflected from the disk 15 back to the optical system 12 which, in response thereto, derives a plurality of detection signals 14a, 14b and 14c which are applied to signal processing electronics 20. The signal processing electronics 20 also receives the encoded data signal 10a from the recording circuitry 10 for use in checking the accuracy of recorded data, as will hereinafter be considered.

The signal processing electronics 20 uses the detected signals 14a, 14b and 14c to provide an output data signal 20a corresponding to data read from the optical disk 15, along with signals 20b and 20c respectively identifying the track and sector locations on the disk from which the data is read. The signal processing electronics 20 also produces control signals 10b, 21a, 21b, 21c, 21d, 21e and 21f. More specifically, control signal 10b is applied to the recording circuitry 10 for synchronizing the encoding of data with disk rotation; control signal 21a is applied to the optical disk motor 18 to provide accurate speed control during recording and reading; control signal 21b is applied to the laser optical system 12 for controlling the radial position of the laser beams 12a, 12b and 12c for the purpose of selecting a desired track; control signal 21c is applied to the laser optical system 12 for providing precise track following of the laser beams on the selected track; control signal 21d is applied to the laser optical system 12 for providing precise focusing of the laser beams 12a, 12b and 12c; and control signal 21e is applied to the recording circuitry 10 for interrupting recording if the reflected read-before-write beam indicates the possibility of an overwrite recording error because the track ahead contains previously recorded data; and signal 21f is applied to the recording circuitry 10 to interrupt recording if a recording error occurs.

Figure 3:
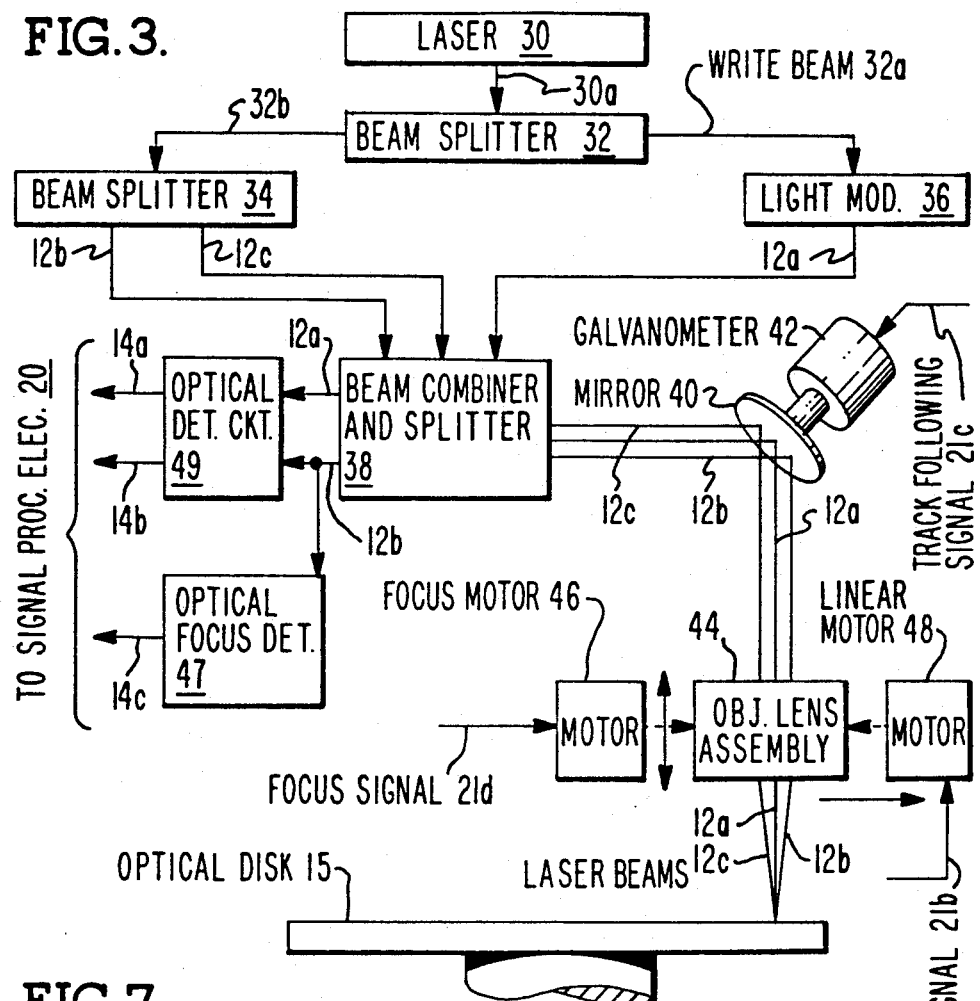
FIG. 3 is a block and schematic representation of the laser optical system shown in FIG. 1.

Reference is next directed to FIG. 3 which illustrates a preferred embodiment of the laser optical system 12 generally shown in FIG. 1. The various components of this laser optical system are illustrated in block and schematic form in FIG. 3 since their implementation can readily be provided by those skilled in the art, as will be evident from the aforementioned references.

As shown in FIG. 3, a laser 30 provides a beam 30a having a wavelength of, for example, 0.633 μm and a power level of, for example, 12 mw. This laser beam 30a is applied to a first beam splitter 32 which splits the beam into a high power beam 32a and a low power beam 32b. The low power beam 32b is applied to a second beam splitter 34 which further splits the beam 32b to provide read-after-write and read-before-write beams 12b and 12c, respectively. It is to be understood that a separate laser could be employed for providing one or more of the above beams if so desired.

The high power beam 32a in FIG. 3 is applied to a high speed light-modulator 36 which modulates the beam 32a in response to the encoded data 10a provided at the output from the recording circuitry 10 in FIG. 1. This light-modulator 36 may, for example, be an acousto-optical digital modulator. The resulting modulated high power beam at the output of the modulator 36 is used as the write beam 12a of the system and is applied to a beam combiner and splitter 38 along with the read beams 12b and 12c which combines the beams taking into account their previously described spacing along the selected track of the disk 15 as typically illustrated in FIG. 2. The resulting three laser beams 12a, 12b and 12c are then reflected off of a mirror 40 mounted to a galvanometer 42. The galvanometer 42 is responsive to the control signal 20c from the signal processing electronics 20 (FIG. 1) so as to cause the mirror 40 to be appropriately deflected as necessary to provide for precise following along the center line of the selected track.

After reflection from the mirror 40, the laser beams 12a, 12b and 12c are then directed to an objective lens assembly 44 mounted on a focusing motor 46. The motor 46 operates in response to the control signal 21d from the signal processing electronics 20 in FIG. 1 to move the objective lens assembly 44 towards and away from the disk 15 so as to thereby maintain accurate focusing of the beams 12a, 12b and 12c on a selected track of the disk. Track selection is provided by controlling the radial position of the beams 12a, 12b and 12c relative to the disk. This is accomplished using a linear motor 48 coupled to the objective lens assembly 44 and responsive to the control signal 21b from the signal processing electronics 20 in FIG. 1.

It will be understood that the two read beams 12b and 12c shown in FIG. 3 are reflected from the disk 15 with a reflected power which is modulated in accordance with the recorded pattern over which the beams pass. The reflected read beams 12b and 12c pass back to the beam combiner and splitter 38 via the objective lens assembly 44 and the mirror 40. The beam combiner and splitter 38 directs the reflected beams to optical detection circuitry 49 which converts the beams into corresponding read-after-write and read-before-write analog electrical signals 14a and 14b which are applied to the signal processing electronics 20 as shown in FIG. 1. Also, at least one of the reflected read beams 12a and 12b is applied to a geometric optical focus detector 47 which provides a relatively low gain, wide capture range signal 14c to the signal processing electronics 20 which is indicative of the quality of focusing of the beams on the selected track.

Next to be considered is the manner in which preformatting is provided for the optical disk 15 in FIG. 1 in accordance with the invention. An example of a typical formatting arrangement is illustrated in FIGS. 4 and 5.

As generally indicated in FIG. 4, the optical disk 15 in the preferred embodiment being described contains a large plurality of circumferential tracks 17. The disk 15 is also divided into a plurality of sectors 19. As indicated in FIG. 4, each track 17 within a sector 19 comprises a header 51 and a data recording portion 52. The data recording portion 52 is the portion into which data is written during recording and comprises the greater portion of the track length within each sector 19. The header 51 of a track 17 is encountered first in each sector 19 and is provided on the disk prior to recording. The provision of such headers 51 on a disk prior to data recording is typically referred to as "formatting" the disk, and the resulting disk is considered to be "preformatted".

FIG. 5 illustrates an example of a performatted header 51 provided in accordance with the invention for each track 17 in each sector 19 of the disk 15 of FIG. 4. Although the optical holes constituting the header 51 need not be physically observable, as mentioned previously, it will be assumed as an example that physical holes, such as pits, are employed for the exemplary header shown in FIG. 5. It will also be assumed that a pit exhibits a relatively high reflectance to an incident beam while unrecorded disk areas exhibit a relatively low reflectance. It is to be understood that an arrangement may be employed in which a portion of the optical recording, such as the header, is recorded using physical holes, such as pits, and the remaining recorded portions, such as those containing data, are recorded using optical holes. It is additionally to be understood that special purpose recording apparatus may be used for providing headers on a disk (that is, preformatting the disk) which apparatus is different from that used for recording data.

Figure 7:
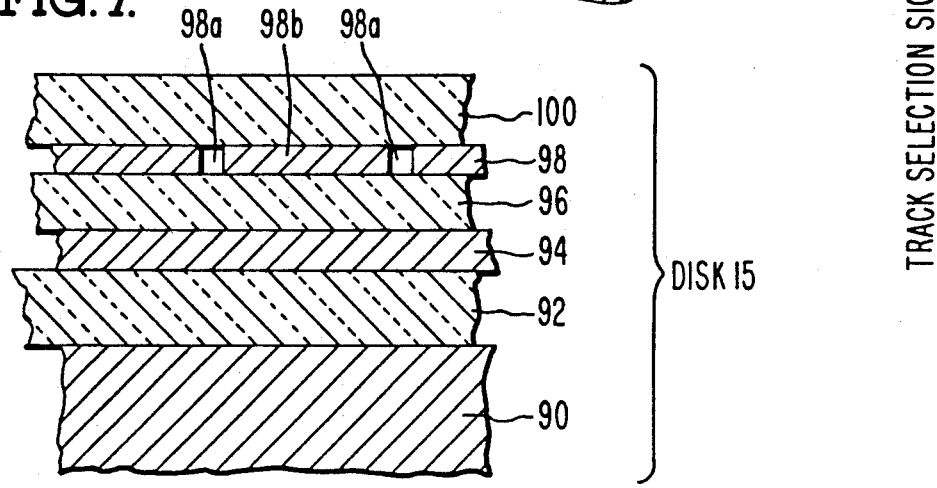
FIG. 7 is a cross-sectional view illustrating the construction of an optical disk employed in the system of FIG. 1.

Before continuing with the description of the header shown in FIG. 5, reference is first directed to FIG. 7 which illustrates a cross-section of a disk 15 which may be employed in accordance with the invention. A supporting substrate 90 such as a 0.1 to 0.3 inch thick disk of aluminum is coated with an organic smoothing layer 92 of, for example, 20–60 microns prior to deposition thereon of a highly reflective opaque layer 94 of aluminum which may, for example, have a thickness of 400–800 Angstroms. An inorganic dielectric layer 96 such as a 800–1200 Angstrom layer of silicon dioxide which is transparent at the laser frequency is deposited over the aluminum reflector layer 94. An absorbing layer 98 which is absorptive at the laser frequency is then deposited over the dielectric layer 96. This absorbing layer 98 may for example be a 50 to 300 Angstrom layer of a metal such as tellurium. Finally, the absorbing layer 98 is overcoated with a protective layer 100, such as a silicon resin having a thickness of, for example, 150 to 500 microns.

Still with reference to FIG. 7, an anti-reflection (dark mirror) condition for a laser beam incident on unrecorded portions of the disk 15 is produced by appropriately choosing the thicknesses and optical characteristics of the layers 94, 96 and 98. Recording on such a disk 15 as illustrated in FIG. 7 is then accomplished by employing an appropriately focused, intensity-modulated recording laser beam (such as laser beam 12a in FIGS. 1–3) which records information by forming pits 98a in the absorbing layer 98 along a selected track, the spacing and dimensions of the pits 98a being representative of the recorded data. Information is read from the disk 15 using an appropriately focused reading laser beam (such as laser beams 12b and 12c in FIGS. 1–3) which is chosen to be of insufficient intensity to affect undisturbed regions 98b of the absorbing layer 98 and has a frequency at which these undisturbed regions 100 exhibit the previously mentioned anti-reflection condition. As a result, the reflected reading beam will be intensity modulated by the pits 98a since the reading beam will experience a relatively high reflection when the beam is incident on a pit 98a, and a relatively low reflection when the reading beam is incident on an undisturbed region 98b. It will be understood that dust particles on the upper surface of the protective layer 100 will be far removed from the focal plane of the optical system (that is, they will be out of focus) so as to have a negligible effect on the above described recording and reading operations.

Reference is now directed back to FIG. 5 for a more detailed consideration of the header 51. Since the header 51 is used in conjunction with the signal processing electronics 20 in FIG. 1 to provide for reliable and precise operation of the system, it will be helpful to describe the construction and arrangement of the exemplary header 51 shown in FIG. 5 in conjunction with FIG. 6 which illustrates a preferred implementation of the signal processing electronics 20 generally shown in FIG. 1. The individual components of FIG. 6 can readily be implemented by those skilled in the art and are thus shown in block form.

Referring to the preformatted heading 51 shown in FIG. 5, it will be seen that immediately following the left sector boundary 19a is a relatively large pit 54 providing a relatively large change in optical reflectance which is used to provide synchronized timing for the signal processing electronics 20. This is accomplished by applying the detected read-after-write signal 14a in FIG. 3 to a peak detector 73 via a preamplifier 71. The peak detector 73 outputs a narrow pulse 73a corresponding to the pit 54 which it recognizes as the largest peak in the playback signal. This narrow output pulse 73a produced by the peak detector 73 is then applied as a timing reference to conventional timing circuitry 75 which generates various timing signals 10b, 21a, 75a, 75b, 75c, 75d and 75e for synchronizing the operation of the system with the disk 15. The purposes of these timing signals will become evident as the description proceeds.

Following pit 54 in FIG. 5 are two pits 56 and 58 elongated in a direction parallel to the track 17 and disposed on opposite sides of the track center line 17a in a staggered relationship. These pits 56 and 58 are used to provide precise track following. This is accomplished in FIG. 6 by applying the amplified read-after-write signal provided at the output of the preamplifier 71 to up-down integrator circuitry 77. The up-down integrator circuitry 77 integrates up in response to the detected signal obtained when the read-after-write beam traverses the portion of the track 17 corresponding to the elongated pit 56, and integrates down in response to the signal obtained when the read-after-write beam traverses the portion of the track 17 corresponding to the elongated pit 58. It will be understood that the difference between these two integrations will be a measure of the preciseness of track following by the laser beams. The dimensions and locations of the elongated pits 56 and 58 are chosen in conjunction with the size of the focused beam so that even very small deviations of the beam from the track center line 17a can be detected. This difference provided by integrator circuitry 77 when pits 56 and 58 are traversed during each sector is accordingly used to produce the control signal 21c which is applied to the galvanometer 42 (FIG. 3) to provide for precise following of a selected track by the laser beams.

It will be noted in FIG. 6 that the timing circuitry 75 provides timing signals 75a and 75b to the up-down integrator circuitry 77. The timing signal 75a is used to delineate the particular times during traversal of the header 51 of each sector for which up and down integrations should be performed so as to appropriately correspond with the locations of the elongated pits 56 and 58. The timing signal 75b is provided during each sector to the up-down integrator circuitry 77 to serve as a hold signal to hold until the next sector the resultant integrated value obtained after the read-after-write beam has completed traversing the second elongated pit 58.

Following the elongated pits 56 and 58 in the exemplary header 51 shown in FIG. 5 are a plurality of pits 60 elongated perpendicularly to the track center line 17a. The locations and dimensions of the pits 60 are chosen so that the reflected signal obtained upon traversing these pits 60 will have a peak value dependent upon the quality of focusing of the incident beam. This may be achieved, for example, by choosing the diameter of each pit 60 so that it is equal to the diameter of a properly focused beam. Then, if the incident beam is larger than the thickness of a pit 60 because of improper focusing, the reflected beam will have reduced power when each pit 60 is traversed, since only a portion of the beam will be reflected. It will also be understood that the spacing between the pits 60 along with the disk rotating speed determine the frequency at which the reflected beam is modulated when traversing the pits 60.

Referring again to FIG. 6, it will be understood that the read-after-write beam 14a applied to the preamplifier 71 during the period that the focusing pits 60 are being traversed contains the resulting focusing information. Accordingly, a peak detector 64, which is enabled by timing signal 75c during the period that the read-after-write beam is traversing the focusing pits 60, is provided to receive the amplified read-after-write beam at the output of the preamplifier 71. The peak detector 64 is adapted to respond to the magnitude of the applied signal within a frequency range determined by the spacing of the pits 60 to produce a relatively high gain output signal 64a which is a measure of the quality of focusing.

The output signal 64a from the peak detector 64 is applied to a signal adder 66 along with the signal 14c provided by the optical focus detector 47 in FIG. 3. The signal adder 66 appropriately combines these two signals 14c and 64a to produce the resulting signal 21d shown in FIG. 1 which is applied to the focusing motor 46 for maintaining precise focusing of the incident laser beams on the disk.

The purpose of providing a signal 21d of the focusing motor 46 comprised of the signal 14c from the geometric optical focus detector 47 and the signal 64a from the peak detector 64 will now be further considered. It will be understood that the signal 14c obtained from the geometric optical focus detector 47 in FIG. 3 provides only a relatively low gain control of the focusing distance which, while providing a wide capture range, typically results in producing a static or low frequency offset error. In accordance with the present invention, as exemplified in FIG. 5, a significantly more precise and offset free focus signal 21d is achieved by combining the geometric optical detector signal 14c with the peak-detected signal 64a derived from the focusing holes 60 which is capable of providing a relatively high gain. Of course, as also applies to the track following pits 56 and 58, the header 51 is repeated a sufficient number of times around each circumferential track 17 to obtain the desired precise and fast-acting control of focusing as well as of track following.

Continuing with the description of the header 51 shown in FIG. 5, the above described focusing pits 60 are followed by pits 72 recorded so as to provide an identification of the particular track and sector being traversed by the laser beams. In other words, the pits 72 represent a track and sector address and conventional encoding can be employed for this purpose, such as is used for identifying tracks and sectors on magnetic disks.

As shown in FIG. 6, the amplified read-after-write signal at the output of the preamplifier 71 is applied along with an appropriate enabling timing signal 75d to a track and sector decoder 78 which provides track and sector signals 20a and 20b respectively (see also FIG. 1) indicating the track and sector being traversed by the laser beams. The track signal 20b is also applied to track selection circuitry 80 along with a track command signal 80a indicative of a selected track to which it is desired that the laser beams be positioned. The track selection circuitry 80 compares the track indicated by the track signal 20b with the track requested by the track command signal 80a and in response thereto produces the signal 21b which is applied to the linear motor 48 in FIG. 3 to center the laser beams over the selected track.

Referring to FIG. 4 along with FIG. 5, it will be understood that, in the exemplary header 51 illustrated, the pits 72 which provide track and sector address identification are the last portion of the header 51. As pointed out previously, the resulting disk containing these headers is considered to be preformatted. Such preformatted disks will typically be provided to users who will make use of the preformatted headers in conjunction with signal processing electronics 20 such as illustrated in FIG. 6 for recording and reading data in the data recording portion 52 of each track 17 in each sector 19.

The amplified read-after-write signal provided at the output of the preamplifier 71 in FIG. 6 is also used for reading data from the data recording portion 51 of each sector 19 (FIGS. 4 and 5). Accordingly, the implementation of FIG. 6 includes data read circuitry 82 to which the output of the preamplifier 71 is applied for providing a data output signal 20a (see also FIG. 1) corresponding to the recorded digital data. The data read circuitry 82 is enabled during the time period that the read-after-write beam is traversing the data portion 52 (FIG. 4) of each sector 19 by the timing signal 75e. The resulting data output signal 20a read from the disk 15 is applied to an appropriate utilization device (not shown) along with the track and sector signals 20b and 20c which identify the track and sector from which data is read.

The data output signal 20a is also used during data recording to check that data is accurately being recorded. For this purpose FIG. 6 includes a data comparator 83 which receives both the data output signal 20a and the encoded data signal 10a from the recording circuitry 10. The data comparator 83 operates to compare the encoded data 10a with the corresponding data 20a read from the disk 15. If the comparator detects an error in the signals 10a and 20a, then the recording error interrupt signal 21f is produced which is applied to the recording circuitry 10 to interrupt recording.

An additional feature of the present invention resides in the manner in which the read-before-write beam 12c (FIG. 2) is employed. It will be appreciated that the density of recording made possible by the present invention is quite high. Thus, the possibility exists that an error in positioning of the laser beams may arise during recording which could result in destroying previously recorded data. Such previously recorded data can be very expensive to replace, if not lost forever if there is no back-up. This problem is prevented by the present invention by making use of the read-before-write beam 12c.

As illustrated in FIG. 6, the read-before-write signal 14b obtained from the optical detection circuitry 49 in FIG. 3 is applied to a preamplifier 91 whose output 91a is in turn applied to a data detector 95 via filter circuitry 93. The filter circuitry 93 is provided to prevent noise from interfering with the operation of the data detector 95. The data detector 95 is responsive to the presence of recorded data to produce an interrupt signal 95a which is applied to the recording circuitry 10 (FIG. 1) to halt recording, thereby protecting previously recorded data. It is to be understood that the read-before-write beam may also be used for other purposes, such as to check the quality of the track prior to recording, or to provide more precise track following and/or focusing control.

Although the description of the invention provided herein has been primarily directed to particular preferred implementations of the invention, it is to be understood that many modifications in construction, arrangement, components, operation and use are possible without departing from the scope of this invention. The appended claims are accordingly intended to cover and embrace all such possible modifications and variations coming within the spirit and scope of the invention.

What is claimed is:

1. In an optical data system, the combination comprising:
    an optical recording medium having at least one track containing a plurality of spaced header recordings disposed along the track, each header recording including a plurality of focusing optical holes arranged in a predetermined pattern;
    reading means including an optical reading radiation beam for reading optical holes in a track of said recording medium, said reading beam having an intensity such that the beam will not disturb the integrity of recorded optical holes;
    means providing for relative movement of said beam along a track; and
    focusing means for controlling the focusing of said beam on said medium;
    said reading means including control means responsive to the reflected reading beam obtained when the reading beam traverses said focusing optical holes for deriving a focusing control signal which is applied to said focusing means for maintaining the beam in focus on said medium.

2. The invention in accordance with claim 1, wherein said beam is a laser beam forming a focused spot on said medium, and wherein the dimensions and spacings of said focusing optical holes are chosen in conjunction with the size of said focused spot so that during traversal thereof by said beam the reflected beam varies in a manner dependent upon the quality of focusing of said beam.

3. The invention in accordance with claim 2, including a geometric optical focus detector to which the reflected beam is applied for providing to said control means a relatively low gain focusing signal having a relatively wide capture range, wherein said control means provides a relatively high gain focusing signal in response to said beam traversing said focusing optical holes, and wherein said control means derives said focusing control signal for said focusing means by combining said relatively high gain focusing signal with said relatively low gain focusing signal provided by said geometric optical focus detector.

4. The invention in accordance with claim 3, wherein said focusing optical holes comprise a plurality of spaced optical holes having dimensions chosen based on the diameter of said spot.

5. The invention in accordance with claim 4, wherein said control means includes a peak detector for deriving said relatively fast response focusing signal based on a detection of the peak signal obtained within a predetermined frequency range when said beam traverses said focusing optical holes, said predetermined frequency range being determined by the spacings between said focusing optical holes.

6. The invention in accordance with claim 1, 2, 3, 4, or 5, wherein said optical recording medium is an optical disk, wherein said means providing for relative movement of said beam along a track comprises means for rotating said disk relative to said beams, wherein said disk includes a plurality of radially spaced generally circumferential tracks, wherein track positioning means are provided for radially moving said beam relative to said disk for positioning said beam on a selected track, and wherein a plurality of said header recordings are spaced around each track.

7. The invention in accordance with claim 6, wherein each header recording includes a timing optical hole of predetermined dimensions so as to be uniquely recognizable in said header recording, wherein said reading means includes means responsive to the reflected beam obtained when said timing optical hole is traversed by said reading beam for producing a timing signal which is applied to said control means for determining when the reading beam is traversing said focusing holes.

8. The invention in accordance with claim 7, wherein said system also includes recording means including an optical recording radiation beam for recording optical holes in the spaces between said header recordings.

* * * * *

UNITED STATES PATENT AND TRADEMARK OFFICE
CERTIFICATE OF CORRECTION

PATENT NO. : 4,417,330

DATED : November 22, 1983

INVENTOR(S) : Robert L. Hazel & Edward V. LaBudde

It is certified that error appears in the above-identified patent and that said Letters Patent is hereby corrected as shown below:

Col. 2, line 59, change "writer" to --write--.

Col. 4, line 5, change "20c" to --21c--.

Col. 7, line 36, change "of", second occurrence, to --to--.

On the title page insert:

-- * The term of this patent subsequent to Aug. 30, 2000, has been disclaimed. --.

Signed and Sealed this

Fourteenth Day of February 1984

[SEAL]

Attest:

GERALD J. MOSSINGHOFF

Attesting Officer

Commissioner of Patents and Trademarks